United States Patent [19]
Aepli et al.

[11] 3,920,856
[45] Nov. 18, 1975

[54] CHEMICAL PEELING OF EDIBLE PLANT PRODUCTS

[75] Inventors: Otto T. Aepli, Southgate; Malachy E. Sorgenfrei, Ypsilanti, both of Mich.; Daniel B. Curtis, Clarendon Hills, Ill.

[73] Assignee: BASF Wyandotte Corporation, Wyandotte, Mich.

[22] Filed: Sept. 13, 1973

[21] Appl. No.: 396,842

[52] U.S. Cl. .................. 426/287; 426/482; 252/351
[51] Int. Cl.² .................... A23L 1/212; A23L 1/216
[58] Field of Search ............ 426/287, 482; 252/351

[56] References Cited
UNITED STATES PATENTS

| | | | |
|---|---|---|---|
| 3,122,508 | 2/1964 | Grifo et al. ........................ | 252/135 |
| 3,294,693 | 12/1966 | Dupre et al. ........................ | 252/156 |
| 3,307,601 | 3/1967 | Aepli ................................. | 196/234 |
| 3,462,520 | 8/1969 | Nehmsmann et al. ............... | 252/352 |
| 3,796,817 | 3/1974 | Aepli et al. ........................ | 426/287 |

OTHER PUBLICATIONS

Woodroof et al., Food Industries, June, 1948 pp. 101–108.

*Primary Examiner*—Norman Yudkoff
*Assistant Examiner*—Curtis P. Ribando
*Attorney, Agent, or Firm*—Joseph D. Michaels; Bernhard R. Swick; Robert E. Dunn

[57] ABSTRACT

The outer layers of edible plant products are removed by contacting the products with an aqueous alkaline caustic solution containing from 0.05% to 1% by weight based on the total weight of solution of an anionic surfactant or mixture thereof corresponding to the formula:

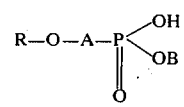

wherein R is an alkyl or alkaryl group having from 8 to 18 carbon atoms in the alkyl chain, B is hydrogen or R-O-A— and A is either oxyethylene or a mixture of oxyethylene and oxypropylene groups wherein the weight ratio of oxyethylene to oxypropylene is 0.25:1 to 8:1 and the total oxyethylene and/or oxypropylene groups represent from about 30% to 80% of the total weight of the surfactant.

6 Claims, No Drawings

CHEMICAL PEELING OF EDIBLE PLANT PRODUCTS

BACKGROUND OF THE INVENTION

1. Field Of The Invention

This invention relates to a process and product for removing the outer layers of tissues from edible plant products. More specifically, it relates to a process of removing the skins from fruits and vegetables by chemical action.

2. Prior Art

Lye peeling of fruits and vegetables has been used in the food processing industries for many years. A lye peeling process requires a generous water supply, caustic solution and a source of heat. The activity of the caustic solution for lye peeling is dependent upon the temperature, the concentration of the solution and the time of immersion. The temperature in the lower caustic solution concentration peeling should be held at or very close to the boiling point of the solution for effective peeling. The higher the temperature for a given caustic solution concentration, the greater the peeling power. For boiling or near boiling temperatures, the peeling power also increases with increasing caustic concentrations. As the concentration of the caustic solution increases, the boiling point of the solution rises. The peeling action of the caustic solution also increases in proportion to the time the edible plant is immersed in the lye bath. The three variables, solution temperature, lye concentration, and time of immersion, can be varied to suit any set of conditions in a particular operation.

With most fruits and vegetables, lye peeling can be accomplished. However, when these products are immersed in strong caustic solutions at temperatures from about 180°F. to 220°F. to obtain quick disintegration of the skin, deep penetration of the lye into the tissues of the edible plant products results and a disintegration of the penetrated tissues is produced. This is primarily due to the fact that upon immersion of the products into the caustic solution, the skin of the treated commodity is cracked, ruptured, destroyed or sloughed off irregularly so that the lye solution, instead of being confined to the skin, is brought into contact with the flesh of the fruit or vegetable and immediately attacks the tissues under the skin to a considerable degree. This results in a high loss of an otherwise edible product.

Waxy skinned fruits, as exemplified by the apple, require more rigorous physical or chemical treatment to remove the skin. When lye peeling is applied to apples, digestion of the skin proceeds very slowly at temperatures below 140°F. Raising the temperature of the lye solution increases the loss of flesh of the apple due to cooking and alkaline digestion beneath the skin. Holding an apple at a temperature of 160°F. or higher for more than a few minutes in a caustic solution causes a marked weakening of structure so that the apple tends to crumble with adverse results on subsequent handling and manipulation.

Furthermore, certain fruits and vegetables are discolored in the strong disintegrating bath, their flavor is changed, and it is difficult to remove the undesirable odor imparted by the solution. Careful and prolonged washing is therefore necessary to remove the odor and to improve the color of the product prior to further treatment and preservation thereof.

Application of the lye solution at or below the cooking temperature has been proposed. The contact time required, however, renders such an operation commercially impractical because the volume of the product undergoing treatment requires apparatus of impractical size.

One method of resolving the abovementioned difficulties is disclosed in U.S. Pat. No. 3,307,601.

It is therefore an object of this invention to provide a more economical and efficient product and method for removing the outer layers of tissues from edible plant products. It is another object of this invention to provide a process that will decrease the immersion time of the commodity to be peeled in the alkaline caustic solution.

It is still another object of this invention to provide a process for peeling fruits and vegetables which will substantially reduce the losses of edible flesh in the peeling of edible plant products by the action of alkaline caustic solutions thereon.

Another object of this invention is to provide a peeling process which is free from disagreeable odors.

Still another object of this invention is to provide a peeling process in which the caustic solution does not gel at room temperatures.

It is a further object of this invention to provide a peeling process in which the lye concentration can be diminished without reducing the peeling performance.

It is a still further object of this invention to provide a peeling process in which the temperature of the lye solution can be lowered without diminishing the peeling performance.

SUMMARY OF THE INVENTION

The present invention resides in the discovery that the addition of certain anionic surfactants to the alkaline caustic solution in a lye peeling process can significantly enhance peeling performance. The three variables in a lye peeling process of time of immersion, lye concentration, and solution temperature can be varied to suit any set of conditions in a particular operation.

The compositions within the scope of this invention for removing the outer layers of tissue from edible plant products comprise an aqueous solution containing from about 1 to 30 weight percent lye and from about 0.05 to 1.00 weight percent, based on total solution of an anionic surfactant. The compositions may also include small amounts of nonionic surfactants.

DESCRIPTION OF THE PREFERRED EMBODIMENT

The anionic surfactants which may be employed in the subject invention may be represented by the following structural formula:

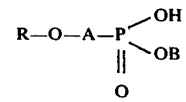

wherein R is an alkyl or alkaryl group having from 8 to 18 carbon atoms in the alkyl chain, B is hydrogen or R—O—A— and A is either oxyethylene or a mixture of oxyethylene and oxypropylene groups wherein the weight ratio of oxyethylene to oxypropylene is 0.25:1 to 8:1 and the total oxyethylene and/or oxypropylene groups represent from about 30% to 80% of the total weight of the surfactant. In addition, mixtures of any of the surfactants defined by the above formula can be employed in the present invention. If a mixture of mono- and diester is employed, the weight of monoester in the ester mix is from about 60% to about 95% and the weight of the diester is from about 40% to about 5%. These anionic surfactants are generally prepared by reacting phosphorous pentoxide or acids of phosphorus having a $P_2O_5$ equivalency of from about 72% to 95% with an alkoxylated alcohol or alkoxylated alkyl phenol. Typical of these surfactants and their methof of preparation are those disclosed in U.S. Pat. Nos. 3,294,693; 3,122,508, and 3,462,520.

Representative anionic surfactants which may be employed in the present invention include:

1. the phosphate ester prepared by the reaction of from one to two moles of an acid of phosphorous having a $P_2O_5$ content of 83% with an ethoxylated $C_{12}$–$C_{18}$ alcohol, said ethoxylated alcohol having an average molecular weight of 380 and an ethylene oxide content of approximately 40% by weight;

2. the phosphate ester prepared by the reaction of from one to two moles of an acid of phosphorus having a $P_2O_5$ content of 83% with an ethoxylated propoxylated $C_{10}$–$C_{12}$ alcohol, said alcohol having an average molecular weight of 810, a weight ratio of oxyethylene to oxypropylene of approximately 6:1, and an alkylene oxide content of approximately 75% by weight; and 3. the phosphate ester prepared by the reaction of one mole of an acid of phosphorus having a $P_2O_5$ content of 72% with the condensation product of one mole of a mixture of $C_{12}$–$C_{15}$ alcohols (molecular weight of 207) with a mixture of ethylene oxide and propylene oxide, said mixture having a molar ratio of oxyethylene to oxypropylene of approximately 0.5:1 and a total alkylene oxide content of approximately 75% by weight.

According to the present invention, edible plant products are peeled by a process comprising the steps of contacting said products with an aqueous alkaline caustic solution containing a small amount of the above-defined anionic surfactants under conditions of concentration, time and temperature sufficient to partially disintegrate the outer layers of tissue of said products without substantial damage to the remainder of said products; removing the wet products from contact with said solution; and rinsing said wet products in water to provide peeled edible plant products.

In the embodiments of this invention, the concentration of lye, e.g., sodium hydroxide or potassium hydroxide, in the solution may be varied over a wide range. For example, the lye concentration may be as low as about 1 weight percent or as high as about 30 weight percent. The concentration of the anionic surfactant may be varied from about 0.05 weight percent to about 1.00 weight percent based on total solution.

If desired, a small quantity of a nonionic surfactant may be added to the treating solution. Suitable nonionic surfactants are the polyoxyethylene-polyoxypropylene block polymers described in detail in U.S. Pat. No. 2,674,619. Other suitable wetting agentsdefoamers are the alkyl aryl polyethers as disclosed in U.S. Pat. No. 2,913,416. Polyethoxylated alcohols as well as amine polyglycol condensates are examples of still other nonionic surfactants that can be employed. Particularly preferred nonionic surfactants useful herein include the condensation products of a linear aliphatic alcohol having from about 8 to 22 carbon atoms in its aliphatic portion or mixtures thereof and alkylene oxides such as ethylene oxide, propylene oxide or mixtures thereof, in a weight ratio of ethylene oxide to propylene oxide of from about 0.25:1 to about 8:1, and wherein the alkylene oxide constitutes from about 30% to 80% by weight of the surfactant molecule. These surfactants are generally prepared, under conventional oxyalkylation conditions, by reacting the alcohol, or mixtures thereof, with the alkylene oxides, in either a sequential addition or with a random mixture of oxides and in the presence of an oxyalkylation catalyst. These surfactants are more particularly described in U.S. Pat. Nos. 3,340,309 and 3,504,041, and Canada 770,644. The amount of nonionic surfactant actually added is generally in the range of five to twenty weight percent based on the total additives or in the range of 0.01 to 0.05 weight percent based on total solution.

The temperatures employed in the process of this invention can vary over a relatively wide range. Usually, the temperature ranged from about 130°F. up to the boiling temperature of the lye solution. The boiling temperature of each lye solution will depend upon the concentration of the lye solution but is usually not greater than about 220°F.

The time of immersion of the edible plant products to be peeled may also be varied over a wide range. For some products, the immersion time may be as little as five seconds. With products having skins that are difficult to remove it may be necessary to increase the time of immersion up to as long as fifteen minutes. The time of immersion for acceptable peel removal of any particular edible plant product is dependent upon such factors as the ripeness of the edible plant product and the concentration of the lye solution. However, for most situations, the preferred immersion time is between ten seconds and ten minutes.

The following examples illustrate the usage of the invention. These examples are merely representative. They are not intended to limit the invention to the removal of skins of only the fruits and vegetables herein illustrated. The process of this invention includes the removal of skins from any edible plant product. Representative plant products which may be peeled in accordance with the subject invention include tomatoes, potatoes, beets, carrots, onions, wheat, popcorn, sesame seeds, squash, peaches, apples, grapefruit segments, pears and figs.

The process described in the following examples is essentially identical. In each instance, the product to be peeled was weighed, contacted with various aqueous caustic solutions for a period of time and at a temperature to partially disintegrate the outer layers of tissue of the product, removed from the caustic solution, rinsed to remove traces of caustic solution, dried, and weighed. The results of the effect of the use of an anionic surfactant in peeling various fruits and vegetables appear in Tables I–VII, below.

In the Tables that follow, the following additives are employed:

Anionic Surfactant I — the phosphate ester prepared by the reaction of from one to two moles of an acid of phosphorus having a $P_2O_5$ content of 83% with an ethoxylated propxylated $C_{10}$–$C_{12}$ alcohol, said alcohol having an average molecular weight of 810, a weight ratio of oxyethylene to oxypropylene of approximately 6:1, and an alkylene oxide content of approximately 75% by weight.

Anionic Surfactant II — the phosphate ester prepared by the reaction of from one to two moles of an acid of phosphorus having a $P_2O_5$ content of 83% with an ethoxylated $C_{12}$–$C_{18}$ alcohol, said ethoxylated alcohol having an average molecular weight of 380 and an ethylene oxide content of approximately 40% by weight.

Nonionic Surfactant I — an ethoxylated alcohol having an average molecular weight of 380 and an ethylene oxide content of approximately 40% by weight.

Nonionic Surfactant II — an alkoxylated $C_{12}$–$C_{18}$ alcohol prepared by condensing four moles of propylene oxide with the product obtained by condensing eight moles of ethylene oxide with one mole of a $C_{12}$–$C_{18}$ alcohol, said alcohol having an average molecular weight of 211.

TABLE I

Effect Of Anionic Surfactant On Peeling Potatoes

Solution Temperature: 175°F.
4 Min. Immersion
Caustic Concentration: 15%

| Additive | Wt. % | Initial Wt. | Peeled Wt. | % Loss | Remarks |
|---|---|---|---|---|---|
| None | — | 117 | 91 | 22 | Peeling very difficult. |
| Anionic Surfactant I | 0.5 | 148 | 126 | 15 | Good peel (100% peel). |
| Anionic Surfactant I / Nonionic Surfactant I | 0.25 / 0.25 | 191 | 160 | 16 | Good peel (100% peel). |

TABLE II

Effect of Anionic Surfactant On Peeling Of Washington Extra Fancy Apples

Solution Temperature: 140°F.
7 Min. Immersion
Caustic Concentration: 10%

| Additive | Wt. % | Initial Wt. | Peeled Wt. | % Loss | Remarks |
|---|---|---|---|---|---|
| None | — | 137 | 131 | 5 | Incomplete peeling; green splotching on peeled fruit. |
| Anionic Surfactant I | 0.5 | 150 | 138 | 8 | Good peel (100% peel). |
| Anionic Surfactant I / Nonionic Surfactant I | 0.25 / 0.25 | 154 | 147 | 5 | Very good peel (100% peel). |
| Anionic Surfactant I / Nonionic Surfactant I | 0.5 / 0.5 | 155 | 152 | 2 | Very good peel (100% peel). |

TABLE III

Effect Of Anionic Surfactant On Peeling Of Jonathan Apples

Solution Temperature: 150° F.
6 Min. Immersion
Caustic Concentration: 15%

| Additive | Wt. % | Initial Wt. | Peeled Wt. | % Loss | Remarks |
|---|---|---|---|---|---|
| None | — | 118 | 110 | 7 | Irregular and incomplete peeling on all produce. |
| Anionic Surfactant I | 0.5 | 138 | 133 | 4 | Excellent peeling (100% peel). |
| Anionic Surfactant II | 1.0 | 131 | 124 | 5 | Excellent peeling (100% peel). |
| Anionic Surfactant I / Anionic Surfactant II | 0.5 / 0.5 | 101 | 94 | 7 | Excellent peeling (100% peel). |

TABLE IV

Effect Of Anionic Surfactant On Peeling Of Western Grown No. 1 Grade Potatoes

Solution Temperature: 160°F.–170°F.
7 Min. Immersion
Caustic Concentration: 15%

| Additive | Wt. % | Initial Wt. | Peeled Wt. | % Loss | Remarks |
|---|---|---|---|---|---|
| None | — | 158 | 142 | 10 | Irregular and incomplete peel. |
| Anionic Surfactant I | 0.25 | 180 | 160 | 11 | Good (100% peel). |
| Anionic Surfactant II | 0.25 | | | | |
| Anionic Surfactant I | 0.20 | 164 | 151 | 8 | Excellent (100% peel). |
| Anionic Surfactant II | 0.25 | | | | |
| Nonionic Surfactant II | 0.05 | | | | |
| Anionic Surfactant I | 0.10 | 244 | 221 | 10 | Excellent (100% peel). |
| Anionic Surfactant II | 0.08 | | | | |
| Nonionic Surfactant II | 0.02 | | | | |

TABLE V

Effect Of Anionic SUrfactant On Peeling Of Bartlett Pears

Solution Temperature: 150°F.–155°F.
1½ Min. Immersion
Caustic Concentration: 11%

| Additive | Wt. % | Initial Wt. | Peeled Wt. | % Loss | Remarks |
|---|---|---|---|---|---|
| None | — | 132 | 113 | 14.2 | 100% peel, but irregular surface. |
| Anionic Surfactant I | 0.05 | 132 | 116 | 11.9 | 100% peel, smooth surface. |
| Anionic Surfactant II | 0.04 | | | | |
| Nonionic Surfactant II | 0.01 | | | | |

TABLE VI

Effect Of Anionic Surfactant On Peeling Of Tomatoes

Solution Temperature: 195°F.
1 Min. Immersion
Caustic Concentration: 13%

| Additive | Wt. % | Initial Wt. | Peeled Wt. | % Loss | Remarks |
|---|---|---|---|---|---|
| None | — | 129 | 116 | 10 | Much skin left, deep pitting on produce. |
| Anionic Surfactant I | 0.10 | 131 | 122 | 7 | Excellent, smooth unpitted surface. |
| Anionic Surfactant II | 0.08 | | | | |
| Nonionic Surfactant II | 0.02 | | | | |

The data presented in the above Tables illustrate the improvement obtained by the addition of certain anionic surfactants to the lye peeling of fruits and vegetables. As is illustrated, the percent weight loss is decreased by the use of the additives in accordance with the subject invention. In addition, the peeling process was much more efficient using the surfactants of the invention.

In the following Table, the effect of anionic surfactants in peeling time for tomatoes is illustrated. As Table VII shows, the addition of an anionic surfactant of the subject invention significantly reduces the peeling time when the caustic concentration and the temperature of the solution are held constant.

TABLE VII

Effect Of Additive On Peeling Time For Tomatoes

Solution Temperature: 210°F.
Caustic Concentration: 18%

| Additive | Wt. % | Peeling Time, Sec. | Peeling Time, % Reduction | Remarks |
|---|---|---|---|---|
| None | — | 40 | — | Incomplete and irregular peel. |
| Anionic Surfactant I | 0.0625 | 20 | 50 | Smooth peel (100% peel). |
| Anionic Surfactant II | 0.0500 | | | |
| Anionic Surfactant I | 0.0625 | 20 | 50 | Smooth peel (100% peel). |
| Anionic Surfactant II | 0.0500 | | | |
| Nonionic Surfactant II | 0.0125 | | | |

The embodiments of the invention in which an exclusive property or privilege is claimed are defined as follows:

1. A process for removing the outer layers of tissue from edible plant products selected from the group consisting of tomatoes, potatoes, beets, carrots, onions, squash, peaches, apples, grapefruit segments, pears and figs comprising contacting said product at a temperature of from about 130°F. to 220°F. for a period of from 5 seconds to 15 minutes with an aqueous alkaline caustic solution containing from about 1 to 30 weight percent caustic concentration and from 0.05 weight percent to 1.00 weight percent, based on total weight of solution of an anionic surfactant represented by the formula:

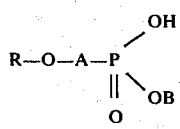

wherein R is an alkyl or alkaryl group having from 8 to 18 carbon atoms in the alkyl chain, B is hydrogen or R—O—A— and A is either oxyethylene or a mixture of oxyethylene and oxyproplene groups wherein the weight ratio of oxyethylene to oxpropylene is 0.25:1 to 8:1 and the total oxyethylene and/or oxypropylene groups represent from about 30% to 80% of the total weight of the surfactant.

2. The process of claim 1 wherein said solution contains from 0.01 to 0.05 weight percent of a nonionic surfactant.

3. The process of claim 1 wherein the anionic surfactant is the phosphate ester prepared by the reaction of from one to two moles of an acid of phosphorus having a $P_2O_5$ content of 83% with an ethoxylated propoxylated $C_{10}$–$C_{12}$ alcohol, said alcohol having an average molecular weight of 810, a weight ratio of oxyethylene to oxypropylene of approximately 6:1, and an alkylene oxide content of approximately 75% by weight.

4. The process of claim 1 wherein the anionic surfactant is the phosphate ester prepared by the reaction of from one to two moles of an acid of phosphorus having a $P_2O_5$ content of 83% with an ethoxylated $C_{12}$–$C_{18}$ alcohol, said ethoxylated alcohol having an average molecular weight of 380 and an ethylene oxide content of approximately 40% by weight.

5. The process of claim 1 wherein the anionic surfactant is a mixture of
   a. the phosphate ester prepared by the reaction of from one to two moles of an acid of phosphorus having a $P_2O_5$ content of 83% with an ethoxylated propoxylated $C_{10}$–$C_{12}$ alcohol, said alcohol having an average molecular weight of 810, a weight ratio of oxyethylene to oxypropylene of approximately 6:1, and an alkylene oxide content of approximately 75% by weight, and
   b. the phosphate ester prepared by the reaction of from one to two moles of an acid of phosphorus having a $P_2O_5$ content of 83% with an ethoxylated $C_{12}$–$C_{18}$ alcohol, said ethoxylated alcohol having an average molecular weight of 380 and an ethylene oxide content of approximately 40% by weight.

6. The process of claim 5 wherein said solution contains from 0.01 to 0.05 weight percent of an alkoxylated $C_{12}$–$C_{18}$ alcohol prepared by condensing four moles of propylene oxide with the product obtained by condensing eight moles of ethylene oxide with one mole of a $C_{12}$–$C_{18}$ alcohol, said alcohol having an average molecular weight of 211.

* * * * *